Nov. 7, 1933.          A. R. RUSSELL          1,934,237
INTERNAL COMBUSTION TURBINE ENGINE
Filed June 16, 1930          4 Sheets-Sheet 1
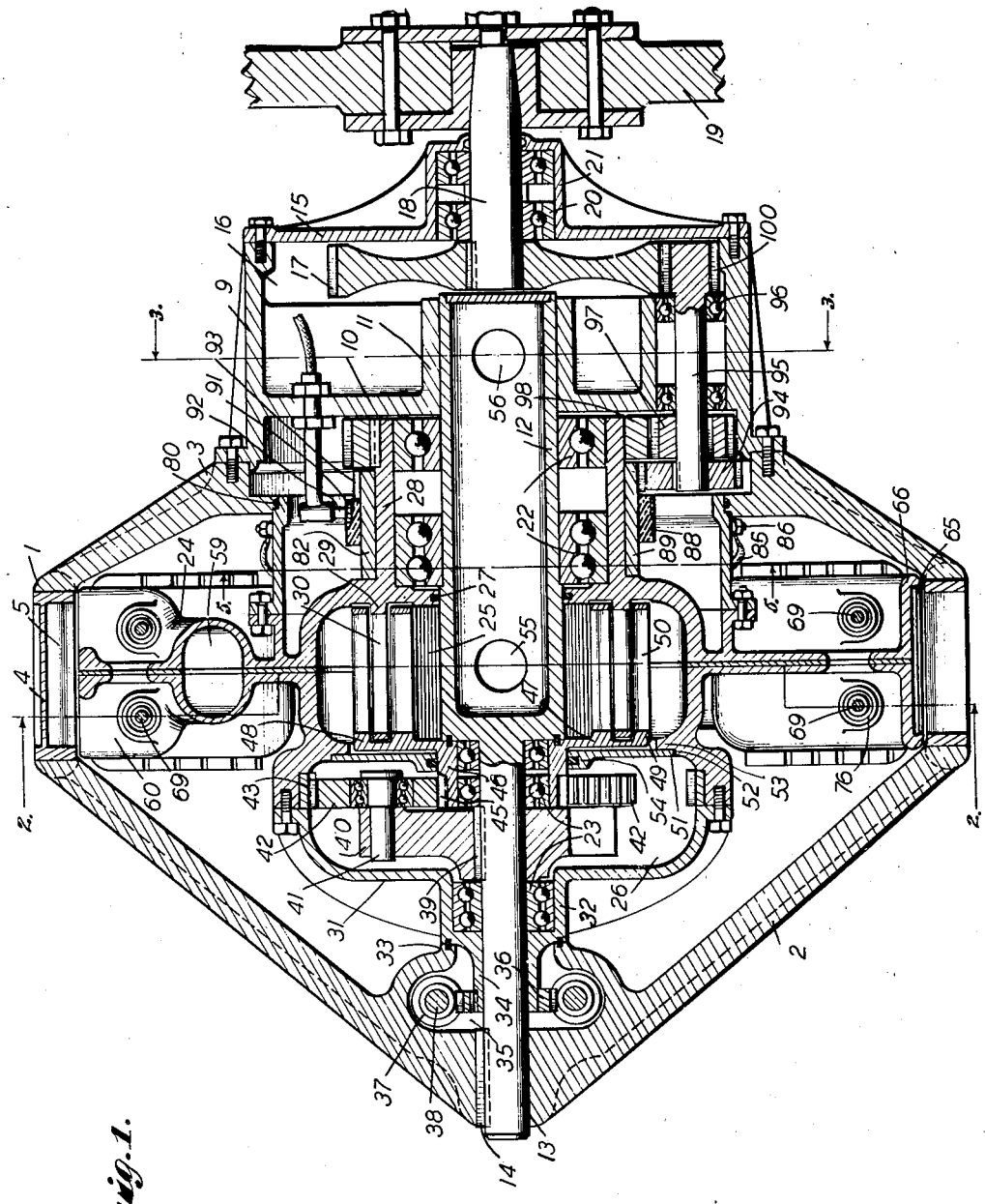
Fig. 1.
INVENTOR.
Alney R. Russell
BY 
ATTORNEY.

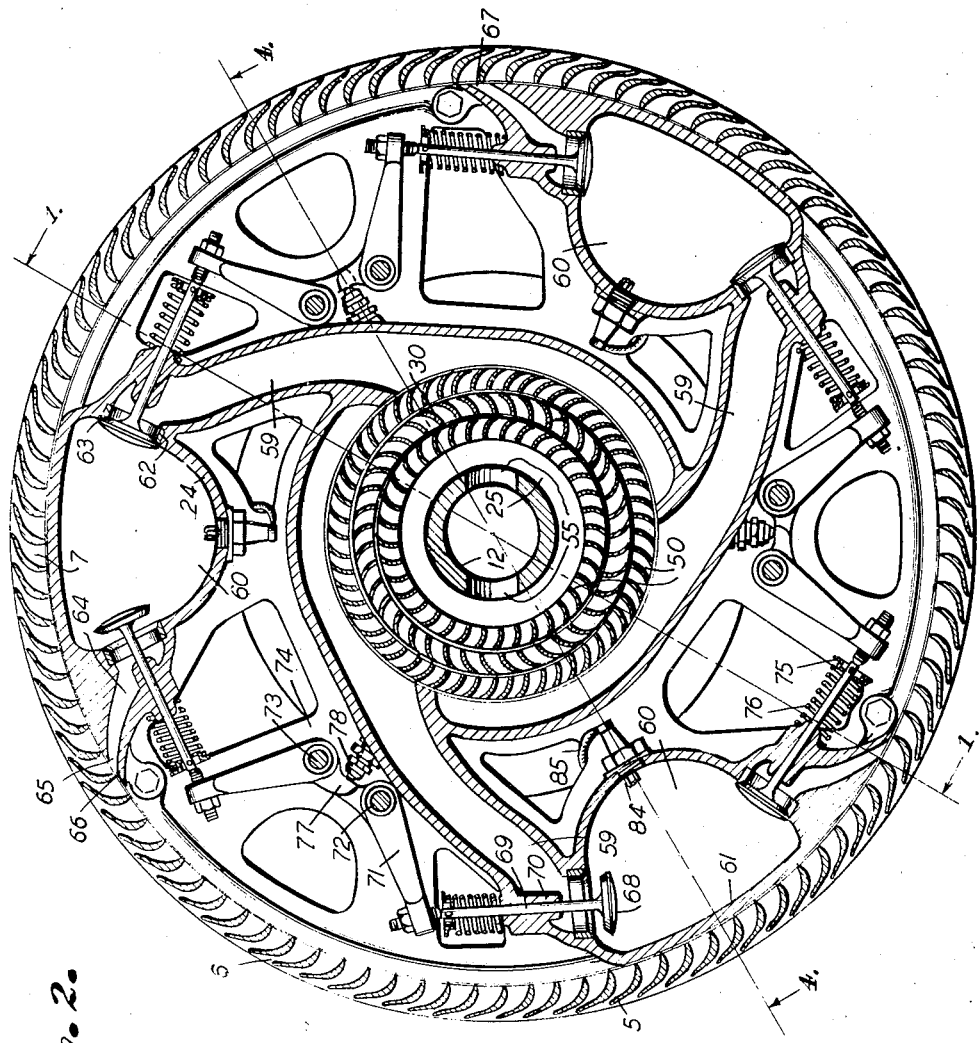

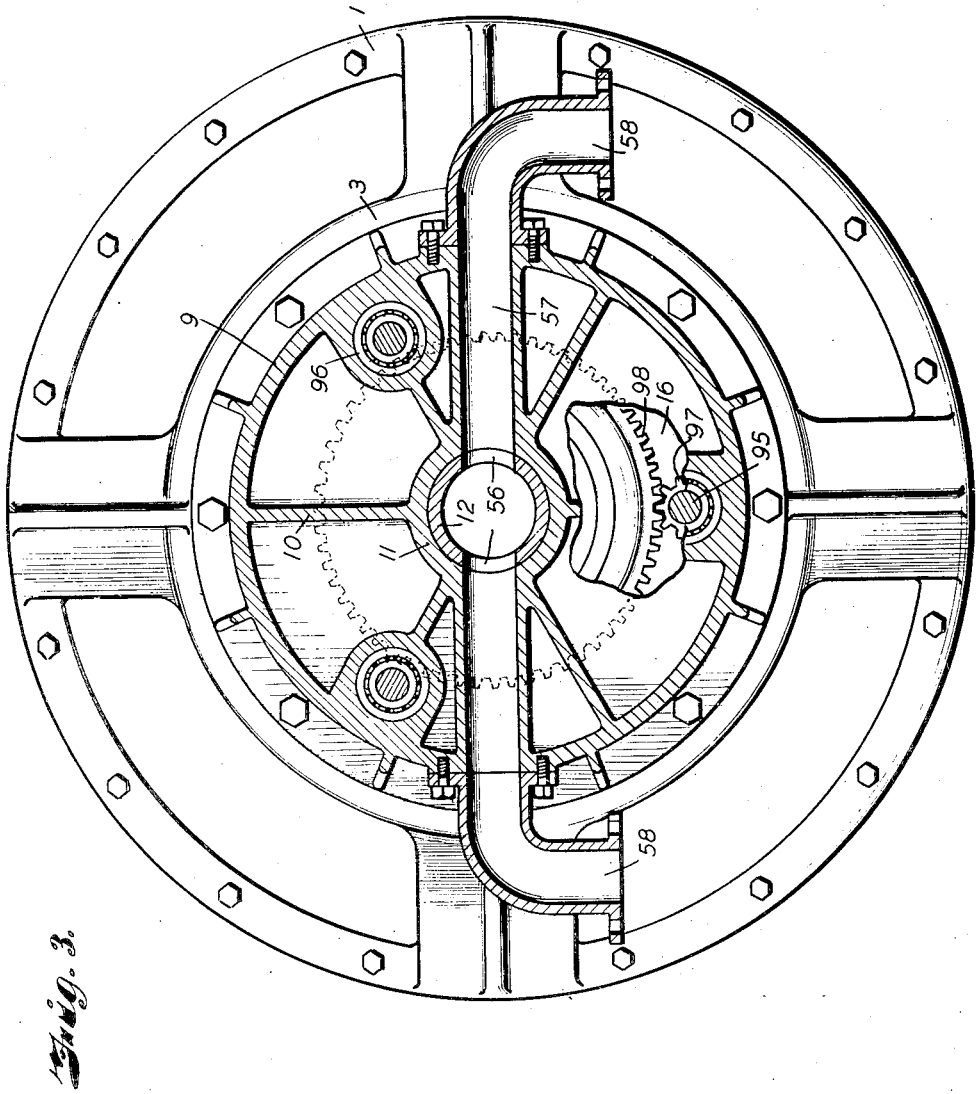

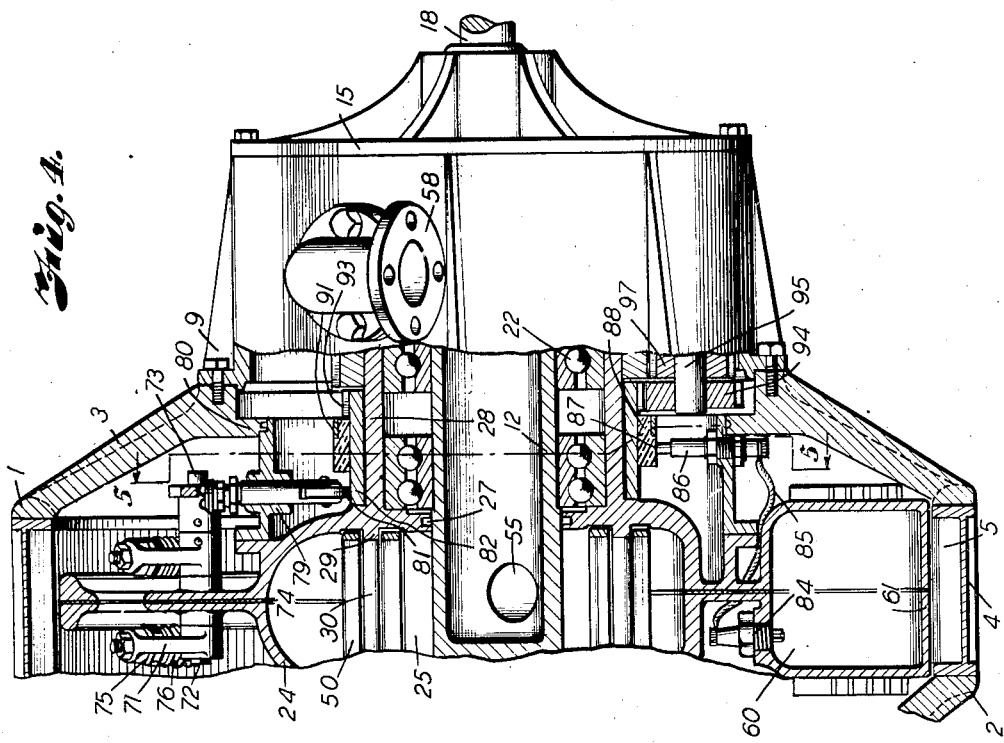
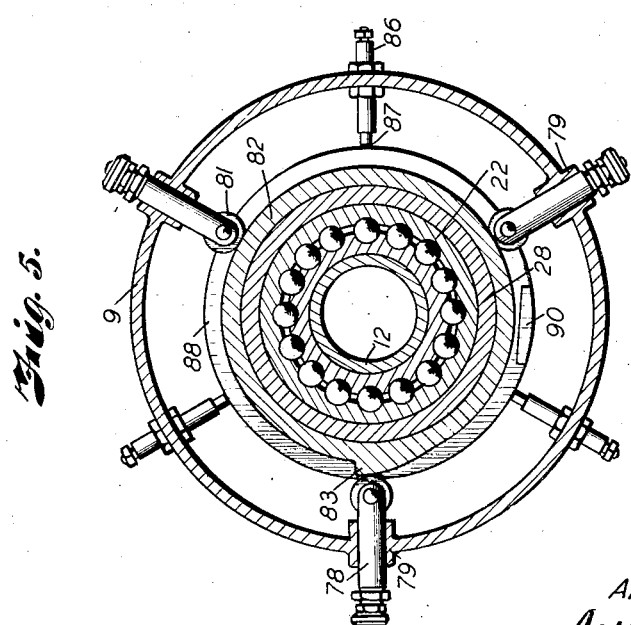

Patented Nov. 7, 1933

1,934,237

UNITED STATES PATENT OFFICE 1,934,237

INTERNAL COMBUSTION TURBINE ENGINE

Alney R. Russell, Kansas City, Mo., assignor of one-half to O. K. Herndon, Kansas City, Mo.

Application June 16, 1930. Serial No. 461,448

6 Claims. (Cl. 60—41)

My invention relates to internal combustion engines, and more particularly to an engine of the turbine type wherein fuel charges admitted to a rotor are mixed, compressed, ignited, and discharged against a stator to actuate a rotor at high speed, and force thus generated transmitted from the engine for useful work; the principal objects of the present invention being to mix and compress the fuel, deliver the fuel in uniform charges, ignite the charges, and deliver the expanded gases against the stator in a manner to provide a smooth and effective application of the forces generated in the engine.

Further objects of the invention are to effect delivery of the fuel to the combustion chamber in such outwardly and rearwardly directed stream line as to promote rotation of the rotor and induction of the fuel by centrifugal force, to distribute impulses of the charges evenly about the stator through differential in speeds of the rotor and ignition control, and to synchronize operation of the valves to effect intake to and exhaust from the combustion chamber in proper sequence.

In accomplishing these and other objects of the invention, I have provided improved details of structure, the preferred form of which is illustrated in the accompanying drawings, wherein:

Fig. 1 is a longitudinal section of an engine embodying my invention on the line 1—1, Fig. 2, illustrating the invention as adapted for use in supplying power for an airplane propeller.

Fig. 2 is a cross section on the irregular line 2—2, Fig. 1.

Fig. 3 is a cross section on the line 3—3, Fig 1.

Fig. 4 is an enlarged view of a portion of the engine partly broken away and in section on the line 4—4, Fig. 2.

Fig. 5 is an enlarged cross section of the valve operating mechanism and part of the ignition control on the line 5—5, Fig. 4.

Referring more in detail to the drawings:

1 designates a housing which I will designate a stator because it acts as a reactor to a rotor. The housing 1 preferably includes a conical spider-like head 2 and an opposite frusto-conical spider-like head flange 3 separated by an integral circular ring portion 4 including stator or transverse elements, preferably formed as spaced, transverse vanes 5, forwardly curved to provide passageways 6 having relatively large intake ports at their inner ends and throats 7 through which charges of expanded gases are exhausted after impact against the vanes, as will presently be described.

Attached to the head flange 3 is a collar 9 provided with an internal spider 10 having a central hub 11 seating the chambered body portion 12 having a reduced extension 13 anchored in the apex of the housing by a spline 14, and forming the axle on which the rotor is mounted.

The end of the housing is closed by a plate 15 forming a chamber 16 for the driven gear wheel 17 on a shaft 18, through which power generated by the engine is applied to a working element, such as a propeller 19; the shaft 18 rotating on roller bearings 20 housed in a boxing 21 on the end plate.

Rotatably mounted on ball bearings 22 and 23 on the shaft sections 12 and 13 is a rotor housing 24 forming an annular fuel intake chamber 25 about the inner end of the hollow shaft section 12 in radial alignment with the vane portion of the stator housing, and a laterally offset gear chamber 26; the end of the fuel chamber section being sealed against the shaft portion 12 by a packing ring 27, and having a laterally extending sleeve 28 housing the bearings 22 which stabilize the rotor and hollow shaft section. Extending inwardly from said end wall of the fuel chamber section is a rib 29 carrying an annular series of curved vanes 30 (Fig. 2) forming part of a super-charger, as presently described.

The end wall 31 of the gear chamber portion of the housing 24 is extended to form a hub 32 which rides on the bearing 23 and is sealed against an interior flange 33 on the housing head 2, and has a reduced extension 34 in a chamber 35 formed by the flange 33 provided with a gear wheel 36, whereby power may be taken from the rotor through worms 37 on shafts 38 for driving accessory elements.

Fixed on the reduced end 13 of the engine shaft, by a spline 39, is a spider 40 provided with a plurality of spindles 41 carrying pinions 42 which mesh with an internal gear ring 43 on the rotor housing 24, and with an external gear ring 45 on the hub 46 of a plate 47 having spaced rings 48—49 on its inner face provided with curved vanes 50 lying at opposite sides of the super-charger vanes 30 and curved reversely thereto; the gearing described effecting rotation of the rings 48 and 49 oppositely to rotation of the rotor to effect compression of fuel within the super-charger.

The fuel and gear chambers 25 and 26 are separated by a diaphragm 51 seated in an offset 52 on the flange 53 on the rotor housing, and sealed against the hub 46 of the plate 47 by a packing ring 54. Fuel is conducted to the chamber 25 through ports 55 in the hollow section of the engine shaft and to the shaft through ports 56 having communication with conduits 57 formed in the stator housing and in coupling sections 58 extending from the housing.

Cast integral with the rotor housing are ducts 59, here shown to be three in number, leading anticlockwise rearwardly and outwardly from the fuel chamber 25 to combustion chambers 60 also formed integral with the rotor housing and at the periphery thereof; the chambers 60 having arcuate outer walls 61 concentric with the stator ring, and separated from the ring to a degree only sufficient to permit free rotation of the rotor.

The ducts 59 communicate with the forward portion of the chamber through bushings 62 provided with rearwardly facing valve seats 63, and opening through the rear walls of the chambers are exhaust ports 64 leading to outwardly restricted passages 65 in extensions 66 of the chamber walls, and terminating in ports 67 through which expanding gases are delivered to the stator vanes.

The inlet and exhaust ports of the respective chambers are controlled by valves 68 having stems 69 extended through bosses 70 on the rotor housing and contacted by levers 71 having hubs 72 fixed to shafts 73 rotatably mounted on the rotor housing, preferably on a web 74 formed integrally with the walls of the ducts 59. The valve stems are preferably provided with stop members 75 and springs 76 located about the stems between the stop members and bosses 70 to yieldingly urge the valves to their seats.

The rotor housing is preferably divided through the ducts 59 and combustion chambers 60 in order that the valves may be inserted and so that the interior of the chambers may be accessible for machining, the sections of the housing being bolted together with a suitable gasket between them to provide a leak-proof joint.

The inlet and exhaust valves for each chamber are preferably in duplicate in order to provide maximum inlet and exhaust of the fuel charges, although I do not wish to be restricted to such arrangement.

Also fixed to each of the valve lever shafts 73 is a lug 77 held by the valve spring 75 against the end of a plunger 78 slidably mounted in a collar 79 fixed to the rotor housing, and having sealed contact at 80 with the head flange of the stator housing; the inner end of the plunger being provided with a roller 81 which rides on a cam ring 82 having running fit on a rotor housing ring 28, the cam ring 82 having a single riser cam lug 83 whereby the valves are operated substantially once for each complete revolution of the rotor.

I prefer to pair the inlet valves of one combustion chamber with the exhaust valves of an adjacent chamber, so that once at each revolution of the rotor the exhaust valves and the inlet valves of a following chamber will be opened to permit simultaneous exhaust of a charge from one chamber and inlet of a charge to the following chamber.

Ignition of charges in the combustion chambers is affected by spark plugs 84 to which current is supplied through conduits 85 connected with binding posts 86 also carried by the valve plunger ring 79, and having brush portions 87 at their inner ends wiping the periphery of a ring 88 of non-conductive material fixed to the ring 82 that is rotatably mounted on the extension ring 28 of the rotor housing.

Located in the non-conductive ring 88 is a contact plate 90 of conductive material, preferably formed as an extension of a conductor ring 91, inset in the non-conductive ring 88 and through which current is supplied by a brush 92 provided with suitable circuit wire; the circuit return being through the motor housing to complete the circuit.

The ring 88 carrying the ignition contact plate is rotatable relatively to the housing through an integral gear 93 meshing with a gear wheel 94 on the power take-off shafts 95. The power take-off shafts are journalled in bearings 96 carried by the spider 10 and by the extension ring 9 of the stator housing, and connected with the rotor through a pinion 97 on the shaft and a gear ring 98 on the rotor housing extension ring 28, and with the driven shaft 18 through the gear wheel 17 on the driven shaft and a pinion 100 on the rotor driven shafts 95.

In order to distribute impulses of the propelling gases uniformly about the stator ring to avoid uneven wear on the ring, I connect the shafts 95 with the rotor ring 28 and the ignition ring 88 and cam ring 82 on different gear ratios, so that while the ignition ring is rotated in the same direction as the rotor it will travel at different speed, and consequently effect ignition of charges in the combustion chamber and delivery of impulses to the stator at changing points during operation of the engine.

With the parts constructed and assembled as described, the engine may be cranked in the usual manner and, when in operation, fuel delivered through the hollow shaft section, under pressure, is drawn into and compressed in the fuel intake chamber and discharged from the chamber by the super-charger; movement of the fuel being promoted by centrifugal action due to the rearward and outward extension of the fuel ducts.

Fuel entering the combustion chambers through the timed opening of the valves is there collected and compressed by oncoming fuel, and, at the proper time, ignited and exploded. Explosion of the charges in the combustion chamber is timed with opening of the exhaust valves, so that the expanding charges are forced through the discharge lines from the chambers into impelling contact with the stator vanes, thereby generating force that tends to rotate the rotor within the stator.

Through the arrangement I have described, the valves are timed to open the exhaust port of a forward combustion chamber simultaneously with opening of the intake port of a following chamber, so that one plunger may operate two valves in proper timed relation, thereby avoiding the duplication of parts.

By moving the ignition ring at a speed different from that of the rotor, I am able to distribute the impulses about the rotor and avoid uneven wear and strain on the vanes, thereby increasing the life of the engine.

It is apparent, therefore, that I have provided an engine of this type having a minimum number of working parts, whereby friction is reduced and a maximum power developed because of avoidance of friction losses.

What I claim and desire to secure by Letters Patent is:

1. In an engine of the character described, a stator including transverse elements, a rotor including a peripheral combustion chamber, and a fuel supply conduit leading to said combustion chamber, an exhaust conduit leading from the chamber and discharging adjacent said transverse elements for delivering fuel and gas to and from the chamber under centrifugal force induced by rotation of the rotor, means for delivering fuel to the supply conduit under initial pressure, means for igniting charges in the combustion chamber, a timing member operable with the rotor to effect operation of the igniting means, a driven member on the timing member, a driving member operable by the rotor, and means operably connecting the driving and driven members for operating the timing member to effect igniting of the charges in the combustion chamber at successively different points during the rotation of said rotor.

2. In an engine of the character described including a stator having transverse elements, a shaft supported by the stator, a rotor rotatably mounted on the shaft including a combustion chamber having inlet and exhaust ports, valves controlling the ports, rocker arms on the rotor for actuating the valves, a ring gear rotatably mounted on the rotor, a ring gear fixed to the rotor, a shaft rotatably mounted in the stator, gears of different diameters on the shaft meshing with the respective ring gears to effect rotation of the movable ring gear at a speed differential from that of the rotor, a cam on the movable ring gear for actuating the rocker arms, and timing means operable by the movable ring gear for causing ignition of fuel charges in the combustion chamber at equal constantly changing points during the rotor movement.

3. In an engine of the character described, a stator including transverse elements, a rotor having a peripheral combustion chamber, a fuel supply conduit leading to said combustion chamber, an exhaust conduit leading from said chamber and discharging adjacent said transverse elements, means for inducing fuel to the supply conduit under initial pressure, valves for controlling passage through the respective conduits, timing means movable with the rotor, a driven member for operating the timing means, a driving member operable by the rotor, means operably connecting the driving and driven members to actuate the timing means at a speed different from that of the rotor for operating the valves at points relative to said stator different from a preceding opening, and means for igniting charges in the combustion chamber.

4. In an engine of the character described, a frame, stator elements included in the frame, a shaft supported by the frame, a rotor rotatably mounted on the shaft including a combustion chamber having fuel inlet and outlet ports, a supercharger rotatably mounted on the shaft, means for operating the supercharger in reverse direction to the rotor, means for supplying fuel to the supercharger for delivery to the combustion chamber, means for igniting the fuel, means for controlling exhausts from the combustion chamber, means rotatably mounted on the rotor for operating said exhaust control means, a gear fixed to the rotor, a gear fixed to the rotatable means, and gears of different diameters operably connecting said gears to drive the rotatable means at a speed different from that of the rotor.

5. In an engine of the character described, a frame, stator elements carried by the frame, a shaft rotatably supported in the frame, a rotor rotatably mounted on the shaft having a combustion chamber provided with fuel inlet and outlet ports, means supplying fuel to the combustion chamber, means carried by the rotor for igniting the fuel in the combustion chamber, means associated with said outlet port for controlling exhausts from the combustion chamber, rotatable means associated with the rotor for operating said exhaust controlling means, a driven member for rotating said rotatable means, a driving member connected with the rotor, means connecting the driving and driven members to actuate said rotatable means at a speed different from that of the rotor for operating the exhaust control means at a point relative to said stator elements different from the preceding operation, and means for igniting charges in the combustion chamber.

6. In an engine of the character described, a stator member, a rotor member having a combustion chamber having a fuel inlet and a gas outlet opening to said stator member, means on the rotor for igniting charges of fuel in the combustion chamber, means rotatable relatively to the rotor for rendering said igniting means effective, and driving means for the rotatable means directly connected in driven relation by the rotor and operable thereby to operate said rotatable means at a speed different from the speed of the rotor to effect operation of the igniting means at constantly and equally changing positions relatively to said stator member.

ALNEY R. RUSSELL.